(12) United States Patent
Sawa et al.

(10) Patent No.: US 8,101,295 B2
(45) Date of Patent: Jan. 24, 2012

(54) LITHIUM SECONDARY BATTERY

(75) Inventors: Shouichiro Sawa, Moriguchi (JP);
Taizou Sunano, Moriguchi (JP); Maruo Kamino, Moriguchi (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 972 days.

(21) Appl. No.: 12/056,559

(22) Filed: Mar. 27, 2008

(65) Prior Publication Data

US 2008/0241646 A1  Oct. 2, 2008

(30) Foreign Application Priority Data

Mar. 28, 2007 (JP) ................. 2007-084482

(51) Int. Cl.
*H01M 6/10* (2006.01)
*H01M 2/02* (2006.01)
*H01M 2/18* (2006.01)

(52) U.S. Cl. ...... 429/164; 429/94; 429/133; 429/231.95
(58) Field of Classification Search .................. None
See application file for complete search history.

(56) References Cited

U.S. PATENT DOCUMENTS

| | | |
|---|---|---|
| 2005/0208379 A1 | 9/2005 | Musha et al. |
| 2006/0019154 A1* | 1/2006 | Imachi et al. ............. 429/144 |
| 2006/0051675 A1 | 3/2006 | Musha et al. |
| 2006/0281012 A1* | 12/2006 | Ugawa et al. ............. 429/330 |
| 2007/0122701 A1* | 5/2007 | Yamaguchi ............. 429/218.1 |
| 2007/0269711 A1 | 11/2007 | Meguro et al. |

FOREIGN PATENT DOCUMENTS

| | | |
|---|---|---|
| JP | 11-233116 A | 8/1999 |
| JP | 2003-303623 A | 10/2003 |
| JP | 2006-134760 A | 5/2006 |

* cited by examiner

*Primary Examiner* — Barbara Gilliam
*Assistant Examiner* — Angela Martin
(74) *Attorney, Agent, or Firm* — Westerman, Hattori, Daniels & Adrian, LLP

(57) ABSTRACT

A lithium secondary battery has a wound electrode assembly (5). The wound electrode assembly (5) has a negative electrode (2) having a negative electrode active material layer containing a negative electrode active material capable of alloying with lithium and having a filling density of 2.0 g/cc or less, a positive electrode (1) having a positive electrode active material layer containing a positive electrode active material made of a transition metal composite oxide, a separator (3) disposed between the positive and negative electrodes and having a penetration resistance of 500 g or greater, and a cylindrical hollow space (14) at a winding axis and in the vicinity thereof, wherein the positive electrode (1), the negative electrode (2), and the separator (3) are spirally wound. A columnar center pin (15) having a diameter of from 75% to 95% of the diameter of the hollow space is disposed in the hollow space.

19 Claims, 5 Drawing Sheets

LITHIUM SECONDARY BATTERY

BACKGROUND OF THE INVENTION

1. Field of the Invention

The present invention relates to a lithium secondary battery comprising a wound electrode assembly having a negative electrode comprising a negative electrode active material alloying with lithium, a positive electrode comprising a positive electrode active material containing a transition metal composite oxide, a separator disposed between the positive and negative electrodes, wherein the positive electrode, the negative electrode, and the separator are spirally wound, the wound electrode assembly having a cylindrical hollow space at the winding axis and in the vicinity thereof.

2. Description of Related Art

Rapid advancements in size and weight reductions of mobile information terminal devices such as mobile telephones, notebook computers, and PDAs in recent years have created demands for higher capacity batteries as driving power sources for the devices. Because of their high energy density and high capacity, lithium secondary batteries are widely utilized as the driving power sources for such mobile information terminals.

A lithium secondary battery generally employs a positive electrode containing a positive electrode active material made of a lithium-transition metal composite oxide, a negative electrode containing a negative electrode active material made of a carbon material capable of intercalating and deintercalating lithium, such as graphite (theoretical capacity: 372 mAh/g), and a non-aqueous electrolyte in which an electrolyte made of a lithium salt, such as $LiBF_4$ and $LiPF_6$, is dissolved in an organic solvent such as ethylene carbonate and diethyl carbonate. In this kind of battery, the charge-discharge operations are performed by migration of lithium ions between the positive and negative electrodes.

As the number of functions of mobile information terminals has increased, the power consumption of the devices has been increasing. Accordingly, demand has been increasing for lithium secondary batteries with further higher energy. An effective means to meet such demands is to use a material having a greater energy density as a positive/negative electrode active material. Taking this into consideration, it may be conceivable to use metallic lithium, which has a greater theoretical capacity than graphite, as a negative electrode active material. Although use of metallic lithium as a negative electrode active material of a lithium secondary battery enables a high charge-discharge capacity, there has been a problem that the metallic lithium causes dendrite formation on the negative electrode, which can lead to battery internal short circuiting.

In view of the problem, it has been proposed to use metals such as Si, Sn, and Al that are capable of alloying with lithium as a negative electrode active material that is expected to achieve a high charge-discharge capacity without causing the foregoing problem. However, when such a metal capable of alloying with lithium is used as the negative electrode active material, the volume of the active material changes greatly due to repeated charge-discharge cycles. Consequently, the negative electrode active material pulverizes and peels off from the negative electrode current collector, resulting in the problem of insufficient current collection performance.

In view of such a problem, Japanese Published Unexamined Patent Application No. 2004-241329 proposes a method for obtaining a sufficient current collection performance even when a material that causes a great volumetric change is used as the negative electrode active material, by combining the negative electrode active material with the negative electrode current collector to prevent the peeling-off of the negative electrode active material from the negative electrode current collector. The method includes, for example, applying a slurry containing a Sn alloy, a binder agent, a diluting solvent onto the surface of the negative electrode current collector, then drying, and thereafter electroplating a metal with a low capability of chemically combining with lithium. Nevertheless, even with such a method, the peeling-off of the active material cannot be prevented sufficiently, and sufficient cycle performance cannot be obtained.

Various other approaches have been proposed. In one example, a negative electrode active material made of an alloy with a high conductivity and a carbon conductive agent are uniformly dispersed to improve the conductivity of the negative electrode active material layer, so that the electrode structure can ensure sufficient current collection performance when the constituent pressure acting on the negative electrode within the battery is sufficient even if the negative electrode active material peels off from the negative electrode current collector because of the expansion of the negative electrode active material. An evaluation of such an electrode structure has been made on a cylindrical battery, which can obtain uniform constituent pressure easily. However, since the outer diameter of the wound electrode assembly is invariable in the cylindrical battery, stress acts toward the inside of the wound electrode assembly, and consequently, deformation 21 (swelling) occurs as illustrated in FIG. 6 such that a portion of the wound electrode assembly 5 sticks out into a hollow space 14 formed in the center area of the winding axis. This causes breakage of the electrode plates, resulting in abrupt capacity degradation. This problem arises also when the negative electrode active material used is a graphite-based one, which causes less expansion. However, in this case, the problem is less serious since it does not occur until the number of charge-discharge cycles is built up. On the other hand, when the negative electrode active material used is an alloy-based one, which causes greater expansion, the problem is far more serious because the deformation starts from the initial stage of cycles and the deterioration of the charge-discharge capacity tends to be accelerated.

In view of such circumstances, there has been a proposal to provide a center pin in the hollow space of the wound electrode assembly to prevent breakage of the electrode plate resulting from the deformation of the wound electrode assembly and to thereby prevent internal short circuits (see Japanese Published Unexamined Patent Application No. 2006-134760).

Nevertheless, when a negative electrode active material that undergoes large expansion is used, deterioration of the cycle performance resulting from the battery internal short circuits or the like cannot be prevented by the just-described configuration alone. When it is attempted to prevent the breakage of the electrode by suppressing the deformation of the wound electrode assembly inward, the force cannot escape toward the inside of the battery, but instead acts in such a direction as to expand the diameter and in such a direction as to squash the separator disposed between the positive and negative electrodes. In this case, especially when a separator made of a soft and flexible material is used, the thickness thereof reduces and squeeze-out of the electrolyte solution occurs, deteriorating cycle performance. In addition, breakage of the separator may occur, which can result in internal short circuits.

The present invention has been accomplished in view of such problems as described above, and it is an object of the invention to provide a lithium secondary battery that achieves a higher battery capacity by employing a negative electrode active material that expands largely and at the same time dramatically improve various characteristics of the battery, such as cycle performance.

BRIEF SUMMARY OF THE INVENTION

In order to accomplish the foregoing and other objects, the present invention provides a lithium secondary battery comprising: a wound electrode assembly comprising: a positive electrode having a positive electrode active material layer containing a positive electrode active material capable of intercalating and deintercalating lithium; a negative electrode having a negative electrode current collector and a negative electrode active material layer formed on both sides of the negative electrode current collector, the negative electrode active material layer containing a negative electrode active material having a filling density of 2.0 g/cc or less and being capable of alloying with lithium; a separator disposed between the positive and negative electrodes and having a penetration resistance of 500 g or greater; and a cylindrical hollow space disposed at a winding axis of the wound electrode assembly and in the vicinity thereof; and a columnar center pin disposed in the hollow space and having a diameter of from 75% to 95% of the diameter of the hollow space, wherein the positive electrode, the negative electrode, and the separator are spirally wound.

The present invention exhibits advantageous effects of achieving a higher energy density in the lithium secondary battery and at the same time significantly improving the battery performance, such as the charge-discharge cycle performance.

DETAILED DESCRIPTION OF THE INVENTION

Figure 1:
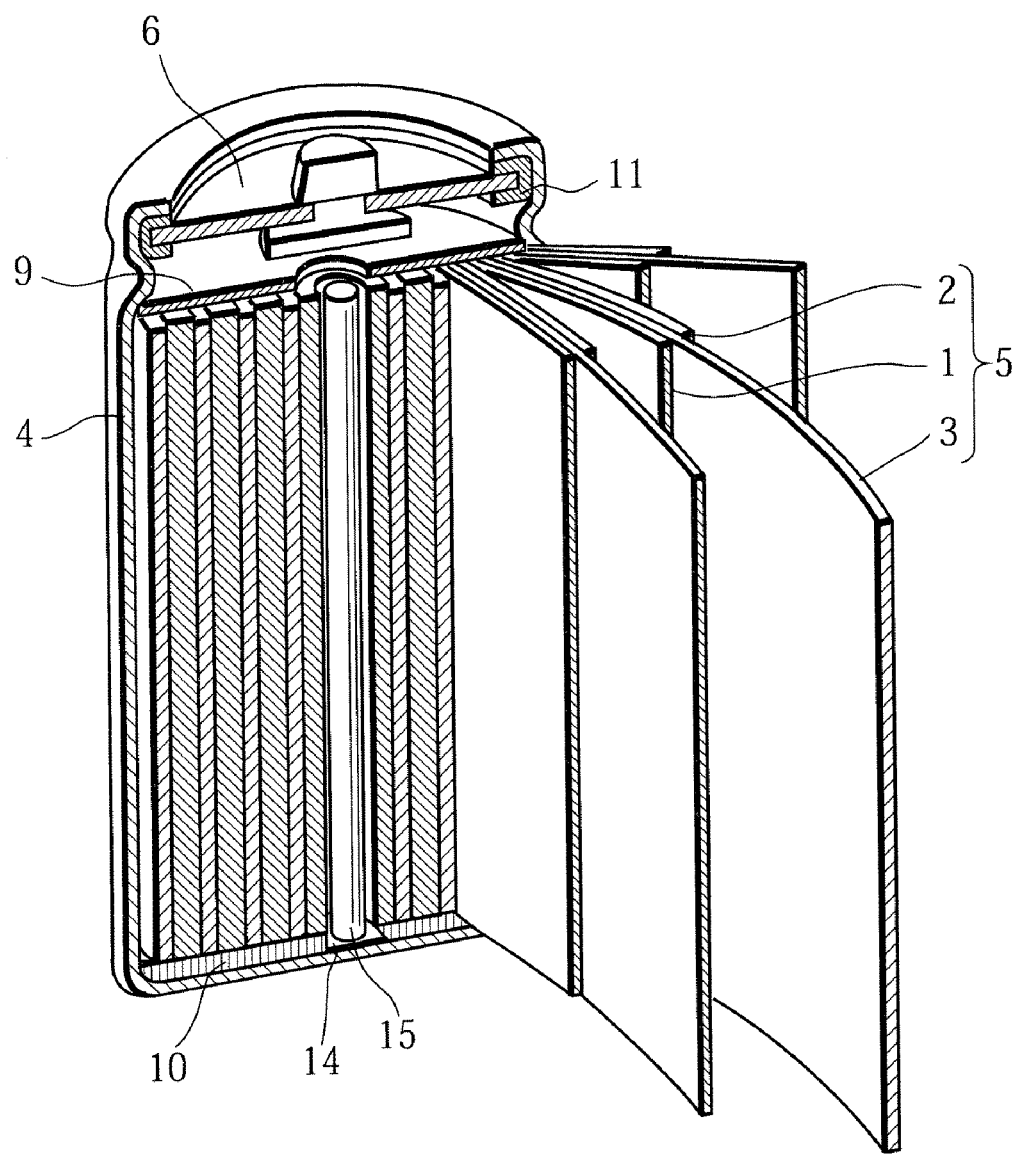
FIG. 1 is a vertical cross-sectional view illustrating a battery of the invention.

The lithium secondary battery according to the present invention comprises a wound electrode assembly comprising: a positive electrode having a positive electrode active material layer containing a positive electrode active material capable of intercalating and deintercalating lithium; a negative electrode having a negative electrode current collector and a negative electrode active material layer formed on both sides of the negative electrode current collector, the negative electrode active material layer containing a negative electrode active material having a filling density of 2.0 g/cc or less and being capable of alloying with lithium; a separator disposed between the positive and negative electrodes and having a penetration resistance of 500 g or greater; and a cylindrical hollow space disposed at a winding axis of the wound electrode assembly and in the vicinity thereof; and a columnar center pin disposed in the hollow space and having a diameter of from 75% to 95% of the diameter of the hollow space, wherein the positive electrode, the negative electrode, and the separator are spirally wound.

When the center pin is provided in the cylindrical hollow space formed at the winding axis of the wound electrode assembly and in the vicinity thereof, the deformation of the wound electrode assembly inward can be suppressed and the breakage of the electrode can be prevented. Although the force that should have been directed inward is redirected toward the separator in the wound electrode assembly by the provision of the center pin, the separator does not easily deform (i.e., the separator is not easily squashed) because the penetration resistance of the separator is restricted to be 500 g or greater. As a result, it becomes possible to prevent the abrupt deterioration of the charge-discharge cycle performance, which is due to the squeeze-out of the electrolyte solution in the separator. In addition, it becomes possible to prevent the short circuiting inside the battery, which is due to the penetration of the expanded negative electrode active material particles through the separator.

Here, the diameter of the center pin is restricted to be from 75% to 95% of diameter of the hollow space. The reason is as follows. Normally, when no center pin is provided, the wound electrode assembly deforms inward about 25% of the diameter of the hollow space. Therefore, if the diameter of the center pin is less than 75% of the diameter of the hollow space, the center pin exhibits no effect. On the other hand, if the diameter of the center pin exceeds 95% of the diameter of the hollow space, it becomes difficult to insert the center pin into the hollow space, reducing the productivity of the battery.

The reason why the filling density of the negative electrode active material is restricted to be 2.0 g/cc or less is as follows. If the filling density of the negative electrode active material exceeds 2.0 g/cc, the expansion of the negative electrode during charge is too large and the separator deforms greatly even when the penetration resistance of the separator is 500 g or greater, so the damage to the separator becomes serious.

Moreover, the reason why the invention is limited to the wound electrode assembly is as follows. Whether or not the conductive network can be maintained even after repeated charge-discharge operations depends greatly on the influence of the constituent pressure of the electrode plate. In the cylindrical battery employing a wound electrode assembly, the constituent pressure acts uniformly, so the conductive network is maintained effectively.

It is preferable that a negative electrode expansion ratio be 1.7 or greater, where the negative electrode expansion ratio is a ratio of the thickness of the negative electrode active material layer after charge to the thickness of the negative electrode active material layer before charge.

When the negative electrode active material has a negative electrode expansion ratio of less than 1.7, the thickness increase of the negative electrode active material layer after charge is small, and therefore, the deformation thereof toward the inside of the wound electrode assembly is not so large. On the other hand, when the negative electrode active material has a negative electrode expansion ratio of 1.7 or greater, the thickness increase of the negative electrode active material layer after charge is large, and accordingly, the deformation thereof toward the inside of the wound electrode assembly is very large. Therefore, the above-described configuration of the present invention is more effective when the negative electrode expansion ratio is 1.7 or greater.

Here, the negative electrode expansion ratio will be discussed further.

The negative electrode active material made of an alloy comprises a material that can form a compound or a solid solution with lithium and a material that cannot form a compound or a solid solution with lithium. Examples of the former material include the group 14 elements such as Si, Ge, Sn, and Pb, and examples of the latter material include Cu, Fe, Ni, Co, Mo, W, Ta, and Mn. The theoretical volume expansion ratios of carbon and the just-mentioned group 14 elements that are fully charged and thereby alloyed with lithium are set forth in Table 1 below.

TABLE 1

| Element | Theoretical volume expansion ratio |
|---------|------------------------------------|
| C       | 1.1                                |
| Si      | 4.12                               |
| Ge      | 3.7                                |
| Sn      | 3.59                               |
| Pb      | 3.34                               |

The expansion ratio of the negative electrode active material layer employing a negative electrode active material made of an alloy is determined by the expansion ratio of the material that can form a compound or a solid solution with lithium and the expansion ratio of the material that cannot form a compound or a solid solution with lithium. The alloy SnCoC [Sn/Co/C (mass ratio 45.6/11.4/43)], which is used in the following examples, expands about 2.2 times when the materials are used at the true densities. Accordingly, although it may depend on the alloy composition, it is believed that the negative electrode active material containing a group 14 element shows an expansion ratio of greater than 1.7.

Matters Related to the Present Invention

It is necessary to construct a conductive network within the negative electrode active material layer by mixing negative electrode active material particles and carbon as a conductive agent together, in order to ensure good current collection performance between the negative electrode active material particles and between the negative electrode current collector and the negative electrode active material layer by means of the constituent pressure of the battery alone even in the case that the negative electrode active material layer peels off from the negative electrode current collector. However, if the negative electrode active material itself has poor conductivity, addition of the conductive carbon will not have sufficient effect. For this reason, in the present invention, it is preferable to use, as the negative electrode active material (i.e., a material capable of alloying with lithium), a material containing Sn, which has a far higher conductivity with the negative electrode active material than Si. In addition, when a material other than Sn is used as a negative electrode active material, it is desirable that the negative electrode active material has a conductivity of $1.0 \times 10$ (S/cm) or higher.

The conductivities of materials containing Sn, graphite, and Si are shown in Table 2 below. It will be appreciated from Table 2 that graphite and the materials containing Sn have higher conductivities than Si.

TABLE 2

| Sample       | Conductivity (S/cm)   |
|--------------|-----------------------|
| SnCo (80/20) | $1.91 \times 10$      |
| Graphite     | $3.49 \times 10^2$    |
| SnCo (64/36) | $2.63 \times 10$      |
| Si           | $1.55 \times 10^{-1}$ |

In the present invention, a preferable example of the conductive agent to be added to the negative electrode active material particles is an amorphous carbon having a primary particle size of 100 nm or less. The reason why it is preferable that the primary particle size should be 100 nm or less is that, if the primary particle size exceeds 100 nm, sufficient conductive network cannot be formed, so the internal resistance of the negative electrode can rise, and the cycle performance consequently may degrade. When the conductive network is formed by mixing a Sn alloy and a conductive agent, the choice of the conductive agent is also important. Taking this into consideration, it is preferable to use acetylene black or Ketjen Black as the amorphous carbon.

Furthermore, it is preferable that the amount of the conductive agent contained in the negative electrode active material layer be from 0.1 mass % to 20 mass % with respect to the total amount of the negative electrode, more preferably from 1 mass % to 10 mass %. If the amount of the conductive agent is less than 0.1 mass % with respect to the total amount of the negative electrode, the conductivity improvement effect cannot be exhibited sufficiently because the amount of the conductive agent is too small. On the other hand, if the amount of the conductive agent exceeds 20 mass % with respect to the total amount of the negative electrode, the negative electrode capacity becomes poor since the amount of the negative electrode active material is too small.

In a battery in which no center pin is provided in the hollow space, the function of the conductive agent cannot be fully exhibited no matter how good a conductive agent is used because the physical contact between the conductive agent and the negative electrode active material etc. is small in the region in which the electrode deforms. On the other hand, in a battery in which a center pin is provided in the hollow space, the constituent pressure acts on the entire electrode, so the physical contact between the conductive agent and the negative electrode active material particles etc. can be maintained over the entire electrode plate, and therefore, the function of the conductive agent is exhibited to the maximum.

PREFERRED EMBODIMENTS OF THE INVENTION

Hereinbelow, the present invention is described in further detail based on examples thereof. It should be construed, however, that the present invention is not limited to the following examples but various changes and modifications are possible without departing from the scope of the invention.

Configuration of the Battery of the Invention

The specific construction of the cylindrical lithium secondary battery according to the present invention is as follows. As illustrated in FIG. 1, the battery has a closed-bottom cylindrical battery can 4 having an opening at its top end, a wound electrode assembly 5 in which a positive electrode 1 and a negative electrode 2 are spirally wound so as to face each other with a separator 3 interposed therebetween, a non-aqueous electrolyte solution impregnated in the wound electrode assembly 5, and a sealing lid 6 for sealing the opening of the battery can 4. The sealing lid 6 serves as a positive electrode terminal, while the battery can 4 serves as a negative electrode terminal. The positive electrode current collector tab (not shown), which is attached to an upper portion of the wound electrode assembly 5, is connected to the sealing lid 6, and the negative electrode current collector tab (not shown), which is attached to a lower portion of the wound electrode assembly 5, is connected to the battery can 4, whereby a structure that enables charging and discharging as a secondary battery is formed. The upper and lower faces of the wound electrode assembly 5 is covered with an upper insulating plate 9 and a lower insulating plate 10, respectively, for insulating the wound electrode assembly 5 from the battery can 4 and so forth. The sealing lid 6 is fixed to the opening of the battery can 4 by crimping it with an insulative packing 11 interposed therebetween.

Figure 2:
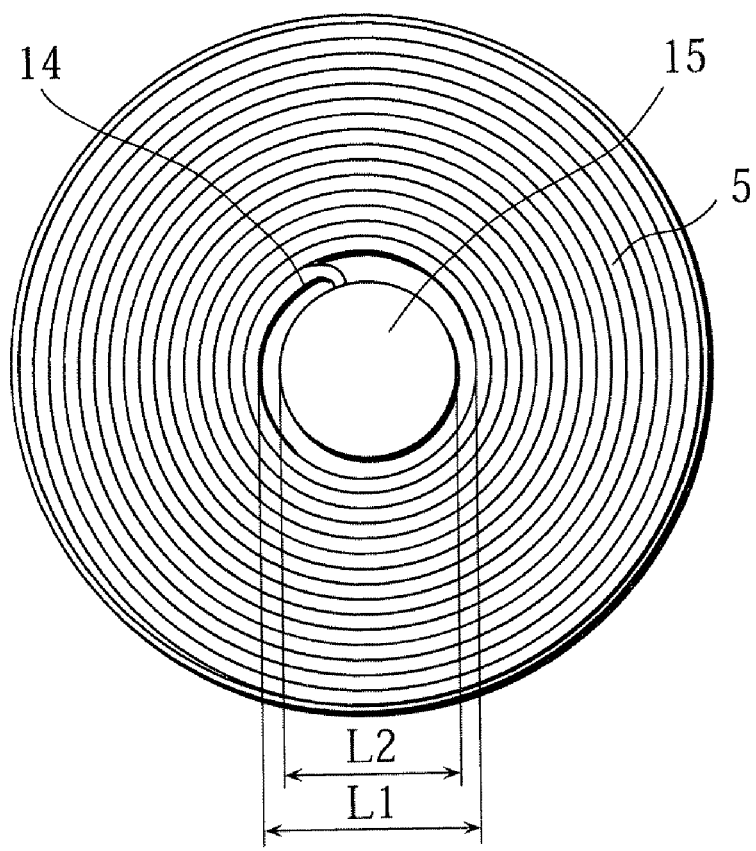
FIG. 2 is a schematic view illustrating a wound electrode assembly used for the battery of the invention.

In the central portion of the wound electrode assembly 5, a hollow space 14 is formed, and a columnar center pin 15 made of stainless steel is provided in the hollow space 14. The length of the center pin 15 is made so as to be substantially the same as the length (height) of the wound electrode assembly 5, and the diameter L2 of the center pin 15 is set at 2.7 mm, as illustrated in FIG. 2. It should be noted that the diameter L1 of the hollow space in the wound electrode assembly 5 is 3 mm, and therefore, the diameter L2 of the center pin 15 is 90% of the diameter L1 of the hollow space in the wound electrode assembly 5.

A lithium secondary battery having the above-described structure was fabricated in the following manner.

Preparation of Negative Electrode

First, SnCoC [Sn/Co/C (mass ratio 45.6/11.4/43)] having an average particle size 5 μm as a negative electrode active material and acetylene black as a conductive agent were weighted so that the mass ratio became 95:5. Next, 95 parts by mass of this mixture was mixed with 8 mass % of a N-methyl pyrrolidone solution containing 5 parts by mass of polyvinylidene fluoride as a binder agent, to obtain a negative electrode active material slurry. Next, the resultant negative electrode active material slurry was applied onto both sides of an electrolytic copper foil (thickness: 10 μm), serving as a negative electrode current collector, and then dried. Thereafter, the resultant material was pressure-rolled so that the filling density of the negative electrode active material became 1.6 g/cc. Lastly, the resultant material was cut into a width of 36 mm and a length of 350 mm to 450 mm, and a nickel metal piece serving as a negative electrode current collector tab was attached to one end thereof.

Preparation of Positive Electrode $Li_2CO_3$ and $CoCO_3$ were used as the starting materials. They were weighed so that the atomic ratio Li:Co became 1:1, followed by mixing them in a mortar. Thereafter, the resultant mixture was press-formed by pressing it with a 17-mm metal mold, and thereafter sintered in the air at 800° C. for 24 hours, to thus obtain a sintered material of $LiCoO_2$. Next, the resultant sintered material was pulverized in a mortar to obtain $LiCoO_2$ powder (positive electrode active material having an average particle size of 20 μm). The resultant $LiCoO_2$ powder, artificial graphite powder as a conductive agent, and polyvinylidene fluoride as a binder agent were weighed so that the mass ratio became 94:3:3. Thereafter, the resultant mixture was mixed with N-methyl pyrrolidone as a solvent, to obtain a positive electrode active material slurry. The resultant positive electrode mixture slurry was applied onto both sides of an aluminum foil serving as a positive electrode current collector and then dried, and thereafter, the resultant material was pressure-rolled. Lastly, the resultant material was cut into a width of 36 mm and a length of 300 mm to 400 mm, and an aluminum metal piece serving as a positive electrode current collector tab was attached to one end thereof.

Preparation of Electrolyte Solution $LiPF_6$ was dissolved at a concentration of 1 mol/L into a mixed solvent of 3:7 volume ratio of ethylene carbonate and diethyl carbonate. An electrolyte solution was thus prepared.

Construction of Battery

First, a separator made of porous polyethylene (thickness: 20 μm, penetration resistance: 550 g) was disposed between the negative electrode and the positive electrode, which were prepared in the above-described manner, and these were spirally wound using a winding core with a diameter of 3.0 mm to prepare a wound electrode assembly. The prepared wound electrode assembly was placed in a battery can. At this time, the lengths of the positive and negative electrodes and the separator were adjusted so that the volume in the space of the battery can that was occupied by the wound electrode assembly became 90%. Next, the center pin was inserted into the hollow space formed at the central portion of the wound electrode assembly (i.e., the space from which the winding core was removed), and the negative electrode tab and the positive electrode tab were welded to the bottom of the battery can and to the sealing lid, respectively. Finally, the electrolyte solution was filled in the battery can, and thereafter the battery can was sealed by crimping the sealing portion, whereby a battery was fabricated.

It should be noted that the penetration resistance of a separator herein refers to the maximum penetration load as determined by the penetration test carried out at a penetration rate of 2 mm/second, using a compression tester made by Kato Tech Co., Ltd. KES-G5 equipped with a needle having a tip with a radius of curvature of 1.0 mm.

FIRST GROUP OF EXAMPLES

Example A1

A battery prepared in the same manner described in the foregoing preferred embodiment was used for Example A1.

The battery fabricated in this manner is hereinafter referred to as Battery A1 of the invention.

Example A2

A battery was fabricated in the same manner as described in Example A1, except that the filling density of the negative electrode active material layer was set at 2.0 g/cc.

The battery fabricated in this manner is hereinafter referred to as Battery A2 of the invention.

Comparative Example Z1

A battery was fabricated in the same manner as described in Example A1 above, except that the separator used was a porous polyethylene material having a penetration resistance of 400 g.

The battery fabricated in this manner is hereinafter referred to as Comparative Battery Z1.

Comparative Example Z2

A battery was fabricated in the same manner as described in Example A1, except that no center pin was provided in the hollow space of the spirally-wound electrode assembly.

The battery fabricated in this manner is hereinafter referred to as Comparative Battery Z2.

Comparative Example Z3

A battery was fabricated in the same manner as described in Example A1, except that the filling density of the negative electrode active material layer was set at 2.4 g/cc.

The battery fabricated in this manner is hereinafter referred to as Comparative Battery Z3.

Experiment

Batteries A1 and A2 of the invention as well as Comparative Batteries Z1 to Z3 were charged and discharged under the conditions set forth below to determine the cycle life of each battery. In addition, samples of the batteries were set aside under the later-described conditions to determine the ratio of defective products due to short circuiting, for each battery. The results are shown in Table 3 below. In Table 3, the cycle life refers to the number of cycles at which the capacity retention ratio (a value obtained by dividing the discharge capacity at the n-th cycle by the discharge capacity at the first cycle) of the battery has reached 60%. The greater the numerical value is, the better the performance. It should be noted that the cycle life for each of the batteries is an index number relative to the cycle life of Battery A1 of the invention, which is taken as 100.

Charge-Discharge Conditions in Cycle Performance Test

Charge Conditions

Each of the batteries was charged at a constant current of 700 mA until the battery voltage reached 4.2 V and thereafter charged at a constant voltage of 4.2 V until the current value reached 35 mA.

Discharge Conditions

Each of the batteries was discharged at a constant current of 700 mA until the battery voltage reached 2.75 V.

The temperature was 25° C. during both charge and discharge.

Conditions in Determining Ratio of Defective Products Due to Short Circuiting

After the electrolyte solution was filled in the batteries, each of the batteries was charged at a current of 35 mA for 4 hours and then set aside for 24 hours at room temperature. Then, the voltage change in the battery was checked to determine whether each battery was defective. Specifically, a battery was determined to be defective when the battery voltage decreased to 2.5 V.

TABLE 3

| Battery | Filling density of negative electrode active material (g/cc) | Separator penetration resistance (g) | Center pin | Ratio of defective products | Cycle life |
|---|---|---|---|---|---|
| A1 | 1.6 | 550 | Yes | 0/10 | 100 |
| A2 | 2.0 | 550 | Yes | 0/10 | 102 |
| Z1 | 1.6 | 400 | Yes | 9/10 | 67 |
| Z2 | 2.0 | 550 | No | 0/10 | 33 |
| Z3 | 2.4 | 550 | Yes | 1/10 | 33 |

Results of the Experiment

The results shown in Table 3 demonstrate the following. Comparative Battery Z2, in which no center pin was provided in the hollow space, showed an abrupt capacity degradation and resulted in a poor cycle life. Comparative Battery Z1, in which the center pin was provided in the hollow space but the separator penetration resistance was small (i.e., the separator penetration resistance was less than 500 g), resulted in a slightly longer cycle life. However, it showed a voltage decrease during initial storage, and many of the samples were unable to perform charge-discharge operations. Comparative Battery Z3, in which the center pin was provided in the hollow space and the separator penetration resistance was large but the filling density of the negative electrode active material was high (in which the negative electrode active material had a filing density of greater than 2.0), showed a poor cycle life. In contrast, each of Batteries A1 and A2 of the invention, in which the center pin was provided in the hollow space, the separator penetration resistance was large, and the filling density of the negative electrode active material was restricted to a certain level (specifically, the filling density of the negative electrode active material was 2.0 or less), yielded no defective products and exhibited a longer cycle life.

In Comparative Battery Z2, no center pin is provided, and therefore, stress acts toward the inside of the wound electrode assembly and the resulting deformation of the wound electrode assembly causes the electrode plate to break. In Comparative Battery Z1, the separator penetration resistance is small, and therefore, microscopic short circuiting occurs when the expansion force acts on the separator in the wound electrode assembly. In Comparative Battery Z3, the filling density of the negative electrode active material is too high, and therefore, the expansion of the electrode plate during charge becomes great during charge and consequently the electrolyte solution is squeezed out from the separator in a large amount. In contrast, in Batteries A1 and A2 of the invention, the center pin is provided. Therefore, the electrode plate breakage resulting from the deformation of the wound electrode assembly can be prevented. Moreover, since the separator penetration resistance is large, microscopic short circuiting is prevented even when the expansion force acts on the separator in the wound electrode assembly. Furthermore, because the filling density of the negative electrode active material is restricted to a certain level, the squeeze-out of the electrolyte solution from the separator, which results from the expansion of the electrode plate during charge, is prevented.

SECOND GROUP OF EXAMPLES

Example B

A battery was fabricated in the same manner as in described in Example A1 of the First Group, except that the negative electrode was prepared in the following manner.

First, a negative electrode active material slurry was prepared, containing 97.5 parts by mass of graphite having an average particle size of 20 μm, serving as a negative electrode active material, 1.5 parts by mass of styrene-butadiene rubber (SBR), serving as a binder agent, 1.0 parts by mass of carboxymethylcellulose (CMC), serving as a thickening agent. Next, the resultant negative electrode active material slurry was applied onto one side of an electrolytic copper foil (thickness: 10 μm), serving as a negative electrode current collector and then dried. Thereafter, the resultant material was pressure-rolled so that the filling density of the negative electrode active material became 1.4 g/cc. Lastly, the resultant material was cut into a width of 36 mm×a predetermined length, and a nickel metal piece serving as a negative electrode current collector tab was attached to one end thereof.

The battery fabricated in this manner is hereinafter referred to as Battery B of the invention.

Comparative Example Y

A battery was fabricated in the same manner as described in Example B, except that no center pin was provided in the hollow space of the spirally-wound electrode assembly.

The battery fabricated in this manner is hereinafter referred to as Comparative Battery Y.

Experiment

The cycle life and the initial capacity were studied for Battery B of the invention and Comparative Battery Y. The results are shown in Table 4 below. The charge-discharge conditions (including the charge conditions in determining the initial capacity) and the definition of cycle life are the same as described in the experiment in the First Group of Examples. Table 4 also shows the results of the experiment for Battery A2 of the invention and Comparative Battery Z2. The cycle life and the initial capacity of each of the batteries is expressed as indices relative to the cycle life and the initial capacity of Batteries A1 and A2 of the invention, which is taken as 100. Further, the expansion ratio of the negative electrode active material (hereinafter, referred simply to as an expansion ratio) is measured in the following manner.

Measurement of Expansion Ratio

Using each of the negative electrodes of Batteries A2 and B of the invention, a three-electrode cell having a lithium counter electrode was prepared, and the thickness of the negative electrode active material layer when the cell was charged to 0 V (vs. Li/Li$^+$) was measured for each of the cells. The ratio of the thickness of the negative electrode active material layer after charge to the thickness of the negative electrode active material layer before charge is defined as the expansion ratio.

TABLE 4

| Battery | Type | Negative electrode active material Filling density (g/cc) | Negative electrode expansion ratio (times) | Separator penetration resistance (g) | Center pin | Cycle life | Initial capacity |
|---|---|---|---|---|---|---|---|
| A2 | alloy | 2.0 | 1.9 | 550 | Yes | 102 | 100 |
| Z2 | | | | | No | 33 | 100 |
| B | graphite | 1.4 | 1.3 | | Yes | 172 | 91 |
| Y | | | | | No | 167 | 91 |

Results of the Experiment

The results shown in Table 4 demonstrate the following. Between Battery B of the invention and Comparative Battery Y, both of which employed a material with a small expansion ratio, graphite, as the negative electrode active material, the difference in cycle life was small and the effect of the provision of the center pin was very little. On the other hand, between Battery A2 of the invention and Comparative Battery Z2, both of which employed a material with a large expansion ratio, an alloy, as the negative electrode active material, there was a remarkable difference in cycle life and the effect of the provision of the center pin was significant.

Thus, the advantageous effect of the present invention is most significant when a negative electrode active material having a large expansion ratio (especially when the negative electrode active material has an expansion ratio of 1.7 or greater).

It should be noted that although the capacity retention ratio was better when the negative electrode active material used was graphite, the initial capacity was higher when the negative electrode active material used was an alloy. The reason is that, in the case of alloy, the occupied volume of the negative electrode within the battery can is greater, and accordingly the amount of the negative electrode active material is greater, because the alloy has a higher capacity per mass than graphite.

Figure 6:
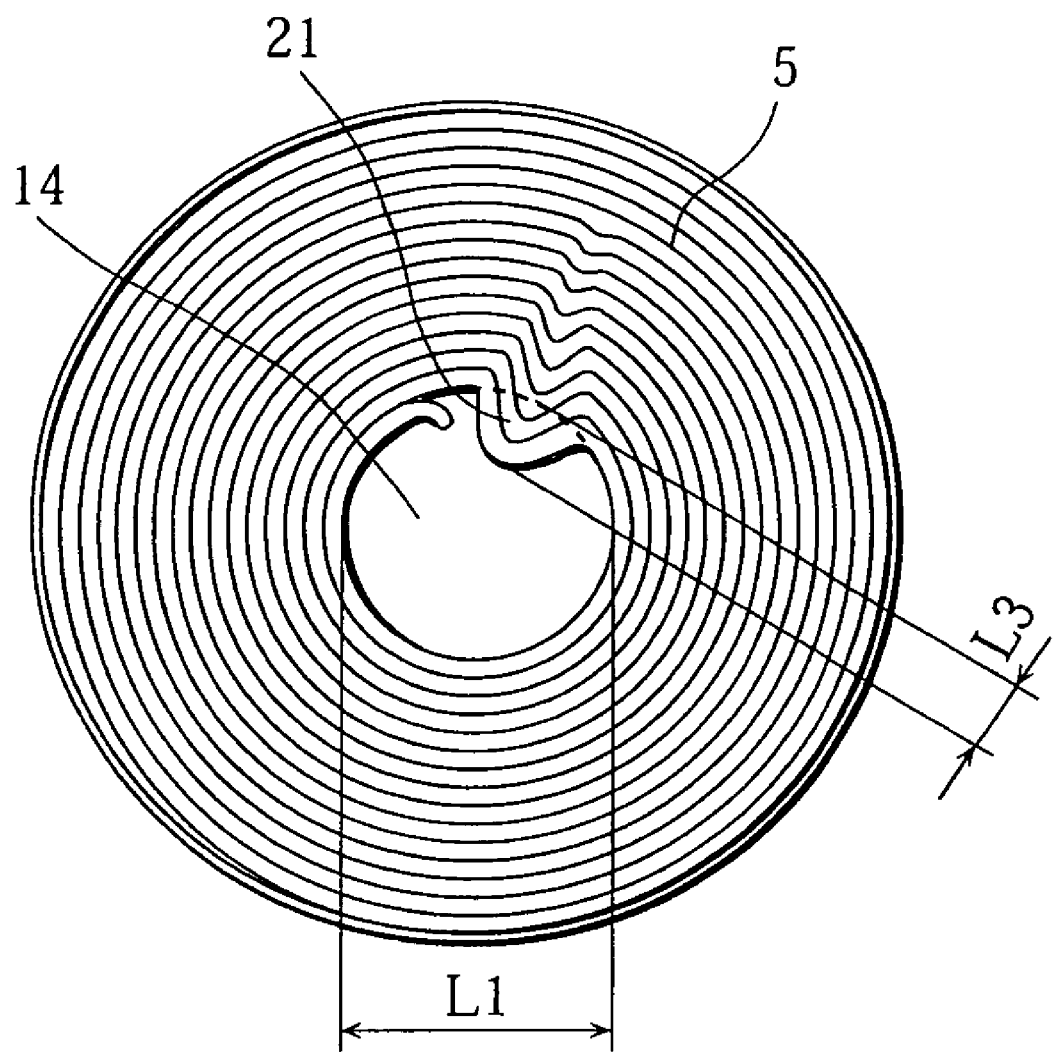
FIG. 6 is a schematic view illustrating a wound electrode assembly used for a conventional battery.

Other Embodiments (1) Although the ratio of the diameter of the center pin to the diameter of the hollow space is not limited to the above-mentioned ratio, it is necessary that the ratio be controlled to be from 75% to 95%. The reason will be explained with reference to FIGS. 2 and 6. Normally, when no center pin is provided, deformation 21 (swelling) is caused in the wound electrode assembly 5 as illustrated in FIG. 6 as the charge-discharge operations proceed. The height L3 of the deformation 21 is about 25% of the diameter L1 of the hollow space 14 (L3/L1≈0.25 in FIG. 6). Therefore, if the diameter L2 of the center pin 15 shown in FIG. 2 is less than 75% of the diameter L1 of the hollow space 14 (i.e., if L2/L1<0.75 in FIG. 2), the center pin 15 will produce no effect. On the other hand, if the diameter L2 of the center pin 15 exceeds 95% of the diameter L1 of the hollow space 14 (i.e., if L2/L1>0.95 in FIG. 2), it will become difficult to insert the center pin 15 into the hollow space 14, degrading the productivity of the battery.

Figure 3:
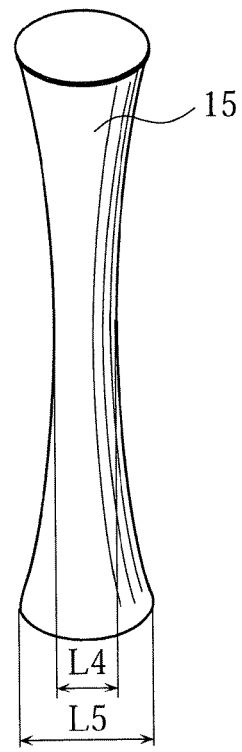
FIG. 3 is a perspective view illustrating a modified example of a center pin used for the battery of the invention.
Figure 4:
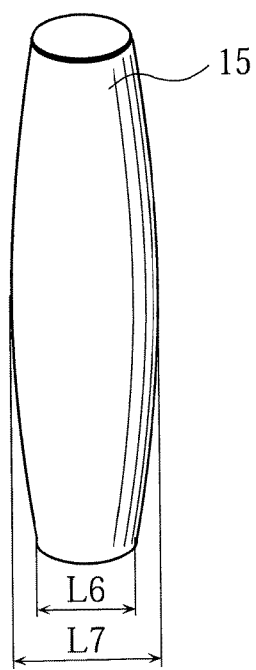
FIG. 4 is a perspective view illustrating another modified example of the center pin used for the battery of the invention.

(2) The shape of the center pin is not limited to that illustrated in the foregoing examples. For example, when the expansion of the negative electrode active material is particularly evident at a central portion of the spirally-wound electrode assembly, it is possible to employ a center pin 15 as illustrated in FIG. 3, in which its central portion has a smaller diameter than its end portions, in order to prevent the separator in the pertinent portion from receiving a large force. When the expansion of the negative electrode active material is particularly evident at the end portions of the spirally-wound electrode assembly, it is possible to employ a center pin 15 as illustrated in FIG. 4, in which its end portions have a smaller diameter than its central portion, in order to prevent the separator in the pertinent portions from receiving a large force. However, even when such a configuration is employed, it is necessary that the diameter of the portion having the smallest diameter (L4 in the case of FIG. 3, or L6 in the case of FIG. 4) be 75% or greater than the diameter L1 of the hollow space, and that the diameter of the portion having the largest diameter (L5 in the case of FIG. 3 or L7 in the case of FIG. 4) be 95% or less of the diameter L1 of the hollow space.

Figure 5:
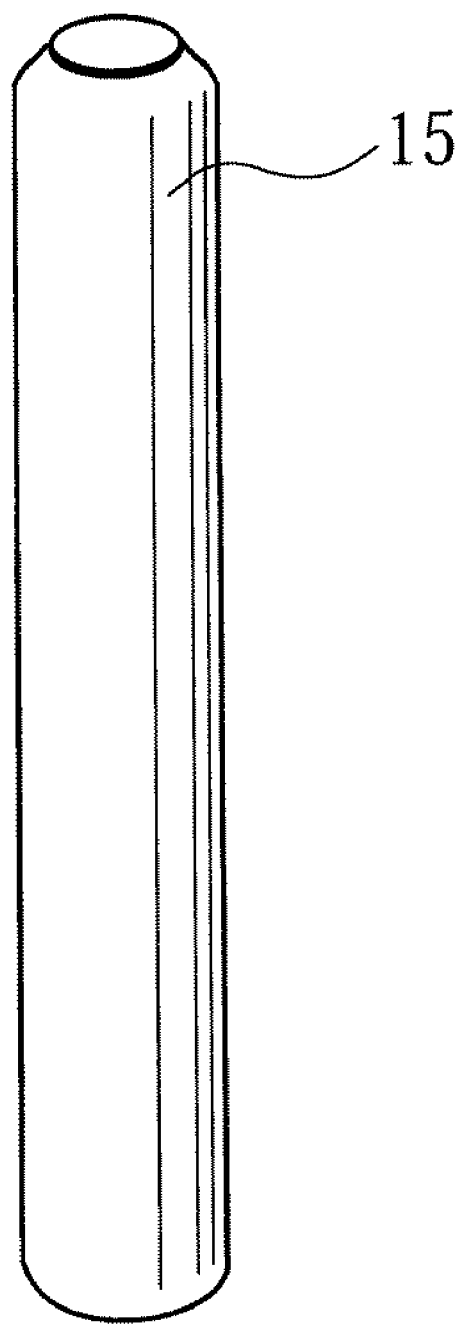
FIG. 5 is a perspective view illustrating yet another modified example of the center pin used for the battery of the invention.

In addition, it is possible to employ the configuration as illustrated in FIG. 5, in which one end of the center pin 15 is tapered, in order to make the insertion of the center pin into the hollow space easier.

(3) A preferable example of the negative electrode binder (binder agent) used in the present invention is polyvinylidene fluoride. Polyimide resins and fluororesins, such as polyvinylidene fluoride and polytetrafluoroethylene, are commonly used as the negative electrode binder. However, in the case that an alloy negative electrode, which has a large expansion ratio, is used as the negative electrode active material, the negative electrode current collector tends to undergo a large stress because of the large expansion if the negative electrode binder has too high a mechanical strength or too high adhesion capability. Consequently, wrinkles occur in the negative electrode current collector, and various problems arise such as deterioration in the cycle performance and an increase in the electrode plate thickness due to the wrinkles. For this reason, it is preferable to use polyvinylidene fluoride, which causes less load on the negative electrode current collector and which has appropriate adhesion capability.

(4) Illustrative examples of the negative electrode current collector made of a conductive metal foil include those made of a metal such as copper, nickel, iron, titanium, and cobalt, and those made of an alloy comprised of combinations thereof. Especially preferable is a metal foil containing copper, more preferably a copper foil or a copper alloy foil.

(5) Examples of the positive electrode active material include lithium-containing transition metal oxides, such as $LiCoO_2$, $LiNiO_2$, $LiMn_2O_4$, $LiMnO_2$, $LiCo_{0.5}Ni_{0.5}O_2$, and $LiNi_{0.7}Co_{0.2}Mn_{0.1}O_2$, and metal oxides that do not contain lithium, such as $MnO_2$. In addition, various substances may be used without limitation as long as such substances are capable of electrochemically intercalating and deintercalating lithium.

(6) Usable examples of the solvent of the non-aqueous electrolyte include, but are not particularly limited to, cyclic carbonates such as ethylene carbonate, propylene carbonate, butylene carbonate, and vinylene carbonate; chain carbonates such as dimethyl carbonate, ethyl methyl carbonate, and diethyl carbonate; esters such as methyl acetate, ethyl acetate, propyl acetate, methyl propionate, ethyl propionate, and γ-butyrolactone; ethers such as 1,2-dimethoxyethane, 1,2-diethoxyethane, tetrahydrofuran, 1,2-dioxane, and 2-methyltetrahydrofuran; nitriles such as acetonitrile; and amides such as dimethylformamide. These solvents may be used either alone or in combination. Particularly preferred is a mixed solvent of a cyclic carbonate and a chain carbonate.

Examples of the solute of the non-aqueous electrolyte include, but are not particularly limited to: lithium compounds represented by the chemical formula $LiXF_y$ (wherein X is P, As, Sb, B, Bi, Al, Ga, or In; and y is 6 when X is P, As, or Sb; or y is 4 when X is B, Bi, Al, Ga, or In), such as $LiPF_6$, $LiBF_4$, and $LiAsF_6$; as well as lithium compounds such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiClO_4$, $Li_2B_{10}Cl_{10}$, and $Li_2B_{12}Cl_{12}$. Of these substances, $LiPF_6$ is particularly preferred.

Examples of the non-aqueous electrolyte in the present invention include gelled polymer electrolytes in which the electrolyte solution is impregnated in a polymer electrolyte such as polyethylene oxide or polyacrylonitrile, and inorganic solid electrolytes such as LiI and $Li_3N$. The non-aqueous electrolyte of the invention can be used without restriction as long as the lithium compound that functions as a solute that achieves lithium ion conductivity, and the solvent that dissolves and holds this solute, are not decomposed when charging and discharging the battery or while stored.

The present invention may be applied not only to the driving power source of mobile information terminals such as portable telephones, notebook computers, or PDAs, but also to large-scale batteries such as the power source for power tools and the in-vehicle power source for electric automobiles and hybrid automobiles.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and is not intended to limit the invention as defined by the appended claims and their equivalents.

What is claimed is:

1. A lithium secondary battery comprising:
   a wound electrode assembly comprising:
   a positive electrode having a positive electrode active material layer containing a positive electrode active material capable of intercalating and deintercalating lithium;
   a negative electrode having a negative electrode current collector and a negative electrode active material layer formed on both sides of the negative electrode current collector, the negative electrode active material layer containing a negative electrode active material having a filling density of 2.0 g/cc or less and being capable of alloying with lithium;
   a separator disposed between the positive and negative electrodes and having a penetration resistance of 500 g or greater; and
   a cylindrical hollow space disposed at a winding axis of the wound electrode assembly and in the vicinity thereof; and
   a columnar center pin disposed in the hollow space and having a diameter of from 75% to 95% of the diameter of the hollow space,
   wherein the positive electrode, the negative electrode, and the separator are spirally wound,
   wherein a negative electrode expansion ratio is 1.7 or greater, where the negative electrode expansion ratio is a ratio of the thickness of the negative electrode active material layer after charge to the thickness of the negative electrode active material layer before charge.

2. The lithium secondary battery according to claim 1, wherein the negative electrode active material contains a group 14 element.

3. The lithium secondary battery according to claim 2, wherein the group 14 element is tin.

4. The lithium secondary battery according to claim 1, wherein the negative electrode active material layer contains a conductive agent.

5. The lithium secondary battery according to claim 2, wherein the negative electrode active material layer contains a conductive agent.

6. The lithium secondary battery according to claim 2, wherein the conductive agent comprises amorphous carbon having a primary particle size of 100 nm or less.

7. The lithium secondary battery according to claim 5, wherein the conductive agent comprises amorphous carbon having a primary particle size of 100 nm or less.

8. The lithium secondary battery according to claim 6, wherein the amorphous carbon comprises acetylene black or Ketjen Black.

9. The lithium secondary battery according to claim 7, wherein the amorphous carbon comprises acetylene black or Ketjen Black.

10. The lithium secondary battery according to claim 4, wherein the amount of the conductive agent is 0.1 mass % to 20 mass % with respect to the total amount of the negative electrode.

11. The lithium secondary battery according to claim 5, wherein the amount of the conductive agent is 0.1 mass % to 20 mass % with respect to the total amount of the negative electrode.

12. The lithium secondary battery according to claim 1, wherein the negative electrode active material layer contains a negative electrode binder comprising polyvinylidene fluoride.

13. The lithium secondary battery according to claim 2, wherein the negative electrode active material layer contains a negative electrode binder comprising polyvinylidene fluoride.

14. The lithium secondary battery according to claim 1, wherein the negative electrode current collector comprises either a metal foil made of at least one metal selected from the group consisting of copper, nickel, iron, titanium, and cobalt, or an alloy foil made of at least two metals selected from the group consisting of copper, nickel, iron, titanium, and cobalt.

15. The lithium secondary battery according to claim 2, wherein the negative electrode current collector comprises either a metal foil made of at least one metal selected from the group consisting of copper, nickel, iron, titanium, and cobalt, or an alloy foil made of at least two metals selected from the group consisting of copper, nickel, iron, titanium, and cobalt.

16. The lithium secondary battery according to claim 14, wherein the negative electrode current collector comprises a copper foil or a copper alloy foil.

17. The lithium secondary battery according to claim 15, wherein the negative electrode current collector comprises a copper foil or a copper alloy foil.

18. The lithium secondary battery according to claim 1, wherein, when the negative electrode active material expands more at a central portion of the spirally-wound electrode assembly than at end portions of the spirally-wound electrode assembly, the shape of the center pin is such that the central portion has a smaller diameter than the end portions.

19. The lithium secondary battery according to claim 1, wherein, when the negative electrode active material expands less at a central portion of the spirally-wound electrode assembly than at end portions of the spirally-wound electrode assembly, the shape of the center pin is such that the end portions have a smaller diameter than the central portion.

* * * * *